United States Patent [19]

Taylor

[11] Patent Number: 4,880,085
[45] Date of Patent: Nov. 14, 1989

[54] BRAKE CAM SHAFT ATTACHMENT APPARATUS

[76] Inventor: Gordon J. Taylor, 18 Seng Street, Graceville, Queensland, 4075, Australia

[21] Appl. No.: 135,324

[22] Filed: Dec. 21, 1987

[51] Int. Cl.$^4$ .................. F16D 51/00; F16D 65/38; B25G 3/28
[52] U.S. Cl. ..................... 188/79.55; 188/196 V; 403/259; 403/359
[58] Field of Search ............... 188/79.5 K, 72.2, 72.9, 188/342, 343, 196 V, 79.55, 332; 403/259, 359; 192/70.23, 111 A

[56] References Cited

U.S. PATENT DOCUMENTS

| 3,076,531 | 2/1963 | Hanley et al. | 188/332 X |
| 3,980,159 | 9/1976 | Baxendale | 188/196 V X |
| 4,343,561 | 8/1982 | Campanini | 188/79.5 K V |
| 4,580,665 | 4/1986 | Saxton et al. | 188/79.5 K |

FOREIGN PATENT DOCUMENTS 0067287 12/1982 European Pat. Off. ....... 188/79.5 K
1417906 10/1965 France ........................... 188/79.5 K

*Primary Examiner*—Robert J. Oberleitner
*Attorney, Agent, or Firm*—Charles Fallow; Martin Hoffman

[57] ABSTRACT

An assembly for attaching a brake cam shaft to a slack adjuster includes a cam shaft with cam elements at one end thereof and an attachment portion at its other end. The shaft has a spline adjacent the attachment portion. A securing member is locatable about the shaft or a shoulder on the shaft, the securing member or shoulder limiting the extent to which the splined end of the shaft may project into or through the splined aperture of the slack adjuster. A fastener is secured to the attachment portion such that when the shaft is securfed to the slack adjuster, the shaft is held fast relative thereto with the slack adjuster located between the shoulder or the securing member and the fastener.

9 Claims, 1 Drawing Sheet

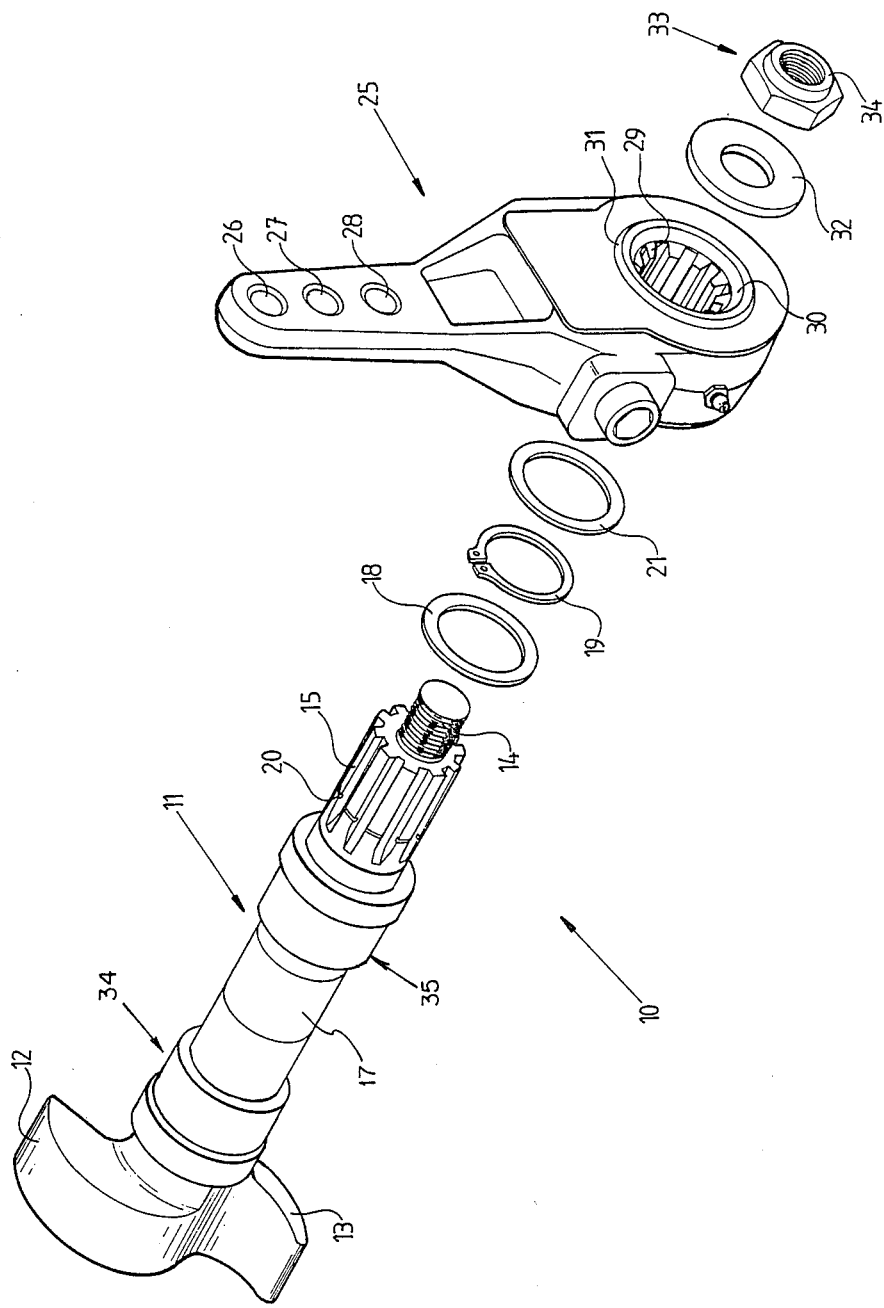

BRAKE CAM SHAFT ATTACHMENT APPARATUS

BACKGROUND OF THE INVENTION

The invention relates to an assembly for attaching a brake cam shaft to a slack adjuster.

Vehicle brakes in relation to which the present invention may be used usually comprise a brake drum, two opposed brake shoes either pivotally secured at one end to each other or to a brake spider and a cam shaft having a cam member or element at one end and a spline coupling at the other end. The cam element is operative to engage brake rollers secured to the other ends of the shoes and these other ends are normally biassed towards each other and against the cam element whereby upon rotation of the cam shaft the rollers are caused to ride over the cam element to thereby expand the shoes and bring them into contact with the brake drum to effect a braking action. In vehicles and in particular in heavy vehicles the cam shaft is rotated by a slack adjuster which is mounted relative to the splined end of the shaft and itself has a complementary splined aperture. Pivotal movement is achieved by securing the distal end of the slack adjuster to a piston rod of an air chamber via a clevis member. Pressurization of the air chamber causes the piston rod to extend from the chamber and this piston rod is coupled to the clevis member. This extension or stroke of the piston rod pivots the slack adjuster and in turn rotates the cam shaft. The purpose of slack adjusters is well known. Such slack adjusters are designed and used to remove any slack from the brake caused by wear of the brake shoes.

Traditionally, the splined end of the cam shaft was formed with a groove for receiving a circlip. The circlip receiving groove was located adjacent the end of the shaft at which the spline was formed. The shaft was assembled and positioned relative to the slack adjuster by engaging the spline of the shaft with the internal spline of the slack adjuster. Upon engagement and proper positioning of the cam elements of the shaft the circlip was then positioned relative to the shaft. The circlip served only to inhibit longitudinal movement of the shaft in one direction, that is, away from the cam elements. Relative movement of the shaft and slack adjuster was otherwise possible in the longitudinal direction whilst the splines were in engagement. The extent of the movement depended upon play between the clevis member and the distal end of the slack adjuster as well as on any clearance between these two splines. If the freedom of movement of the cam shaft was excessive then this led to undue wear of the spline and in some instances damage to the vehicle brake and possibly to the axles about which the brake drums were mounted. In addition, this circlip type connection tended to damage the side plate of the slack adjuster.

SUMMARY OF THE INVENTION

It is an object of the present invention to provide a brake cam shaft attachment assembly which at least minimises some of the disadvantages referred to above.

According to one aspect of the invention there is provided a brake cam shaft attachment assembly for attaching a brake cam shaft relative to a slack adjuster, the slack adjuster having an opening therethrough with a spline formed therein, said assembly including a cam shaft having cam elements at one end thereof and an attachment portion at the other end thereof, a spline on said shaft adjacent said attachment portion, a securing member locatable about and to the shaft or a shoulder in the shaft, said securing member or shoulder limiting the extent to which the splined end of the shaft may project into and/or through the splined aperture of the slack adjuster and fastening means securable to said attachment portion, whereby when said shaft is secured relative to a slack adjuster the shaft is held fast to the slack adjuster with the latter located on said shaft and between said shoulder or said securing member and said fastening means.

The attachment portion provided at the other end of the shaft may comprise a screw threaded extension to the shaft. Preferably, the extension is of a diameter less than the diameter of the shaft.

The securing member may be attachable or permanently secured to the cam shaft at a location spaced from the other end. The securing member may comprise an enlargement formed on the shaft. In another embodiment the securing member may comprise a ring secured to the shaft and spaced from the other end. In another embodiment the securing member may comprise a circlip and in which case a circlip receiving groove is formed on the shaft adjacent to and spaced from the other end of the shaft. In another embodiment a securing member of either of the above types may be eliminated and an abutment or shoulder may be formed on the shaft. The abutment or shoulder then limits the extent to which the other end of the shaft may be inserted into and through the splined aperture of the slack adjuster. This embodiment is particularly useful where the shaft has one relatively large diameter along its length and is finished off at the other end with a reduced diameter portion with the spline of the shaft formed on that reduced diameter portion.

Where a securing member either in the form of an enlargement on the shaft, ring or circlip is employed it is preferable that a spacer be positioned between that member and the slack adjuster. This ensures that the member does not engage upon a side face of the adjuster which may lead to damage of either the adjuster or the member. It is usual for the shaft to be journalled for pivotal movement about one or more bearings or bushes positioned along the length of the shaft between its ends. Preferably a second spacer is employed between the securing member and an adjacent bearing or bush. This ensures that the bearing or bush does not contact the securing member. In one embodiment the or each spacer may comprise a washer.

The fastening means which secures the attachment portion of the shaft relative to the slack adjuster may be in the form of a fixing member which may be secured relative to the attachment portion to clamp the slack adjuster between it and the securing member. In one embodiment the fixing member comprises a threaded fastener. Preferably the threaded fastener is a locking fastener to ensure that once attached to the attachment portion it cannot readily be undone or dislodged by vibration or the like. Preferably the locking fastener comprises either a lock nut or a nut together with a spring washer. Preferably the fastening means also includes a washer against which the lock nut or nut may locate when the assembly is put together.

BRIEF DESCRIPTION OF THE DRAWING

A particular preferred embodiment is illustrated in the drawing which shows an exploded perspective view of an assembly according to the invention.

DESCRIPTION OF THE PREFERRED EMBODIMENT

The assembly 10 includes a cam shaft 11. Shaft 11 has cam members 12 and 13 integrally formed at one end thereof. Cam members 12 and 13 cooperate with brake shoe rollers and ensure that the shoes are biassed apart upon rotation of the shaft 11. The other end of the shaft is formed with a reduced diameter threaded attachment portion 14. Adjacent portion 14 the shaft is provided with a spline 15. The shaft 11 has zones 16 and 17 which may be journalled relative to bearings or bushes (not shown) to mount the shaft 11 for rotation. Spacer washer 18 ensures that the bearing or bush which locates about shaft portion 17 does not engage or interfer with circlip 19. Circlip 19 is received within circlip groove 20 and this groove locates the circlip at a point spaced from the end of the shaft at which the threaded attachment portion 14 is located. A further spacer washer 21 is located on the opposite side of circlip 19 to that at which spacer washer 18 is located.

The slack adjuster 25 may be coupled to an air chamber (not shown) via a clevis member (not shown). The clevis member may be secured to a select one of apertures 26, 27 and 28 which are located at the free end of the slack adjuster. The slack adjuster 15 has a through bore formed with a spline 29. The spline 29 has end faces 30 only one of which is visible in the exploded view of the drawings. A circumferential raised portion 31 extends around each end face 30 of the spline of the slack adjuster. The face of the slack adjuster (not visible) is constructed in a similar fashion. Spacer washer 21 locates against spline face 30 on the adjacent side of the slack adjuster whereas washer 32 locates within raised portion 31 and against face 30 of the side of the slack adjuster 25 visible in the drawing. Lock nut 33 has an integrally formed locking ring 34.

To assemble the arrangement shown in the drawing spline 15 is brought into engagement with spline 29 and in this way threaded attachment portion 14 projects through the opening in the slack adjuster. Spacer washer 18 locates around the shaft 11 and cannot move towards the end of the shaft having the threaded portion 14 because circlip 19 locates in groove 20. Circlip 19 cannot contact the spline face 30 on the other side of the slack adjuster because the spacer washer 21 is interposed. Once portion 14 projects through the opening in the slack adjuster washer 32 is positioned over portion 14 and the lock nut 33 is threaded onto portion 14 until washer 32 is pressed against face 30. Thus, with the lock nut 33 tightened in the manner described above the slack adjuster 25 is securely held between circlip 19 and washer 32 with spacer washer 20 interposed between it and the circlip. In this way the shaft 11 is securely locked relative to the slack adjuster and cannot move longitudinally in either direction. Bushes 34 and 35 are shown located on the shaft 11.

The assembly of the invention relative longitudinal movement between the cam shaft and the slack adjuster is eliminated and damage or wear between the splines which may be caused by longitudinal relative movement between the shaft and the slack adjuster does not occur.

What I claim is:

1. A brake cam shaft attachment assembly for attaching a brake cam shaft relative to a slack adjuster, the slack adjuster having an opening therethrough with a spline formed therein, said assembly including the cam shaft having cam elements at one end thereof and a threaded attachment portion at the other end thereof, a spline on said shaft adjacent said attachment portion, a circlip locatable about and to the shaft at a location spaced from the one end, said circlip limiting the extent to which the splined end of the shaft projects into the splined aperture of the slack adjuster, a washer locatable about the other end and a threaded fastening means securable to said attachment portion at the other end whereby, when said shaft is secured relative to the slack adjuster, the shaft is locked fast to the slack adjuster to prevent relative longitudinal movement with the latter located on the shaft and between said circlip and said washer with the washer clamped against a side face of the spline of the slack adjuster by said fastening means.

2. The attachment assembly of claim 1 wherein the circlip is attachable to the shaft.

3. The attachment assembly of claim 2 including a spacer locatable on the shaft circlip and the slack adjuster.

4. The attachment assembly of claim 1 including a spacer locatable on the shaft between the circlip and the slack adjuster.

5. The attachment assembly of claim 4, wherein said shaft is journalled for rotation relative to bushes and the assembly includes a further spacer locatable on the shaft between one of the bushes and the circlip.

6. The attachment assembly of claim 1 wherein said fastening means comprises a lock nut.

7. The attachment assembly of claim 1, wherein the attachment portion comprises a screw threaded extension to the shaft and the fastening means comprises a threaded nut engageable with the extension.

8. The attachment assembly of claim 7 wherein the circlip is permanently secured to the shaft.

9. The attachment assembly of claim 7 including a spacer locatable on the shaft between the circlip and the slack adjuster.

* * * * *